June 23, 1970     A. R. MAXEY     3,516,146
METHOD OF ASSEMBLING A HELICAL SCANNING ASSEMBLY
Filed June 19, 1968     11 Sheets-Sheet 1
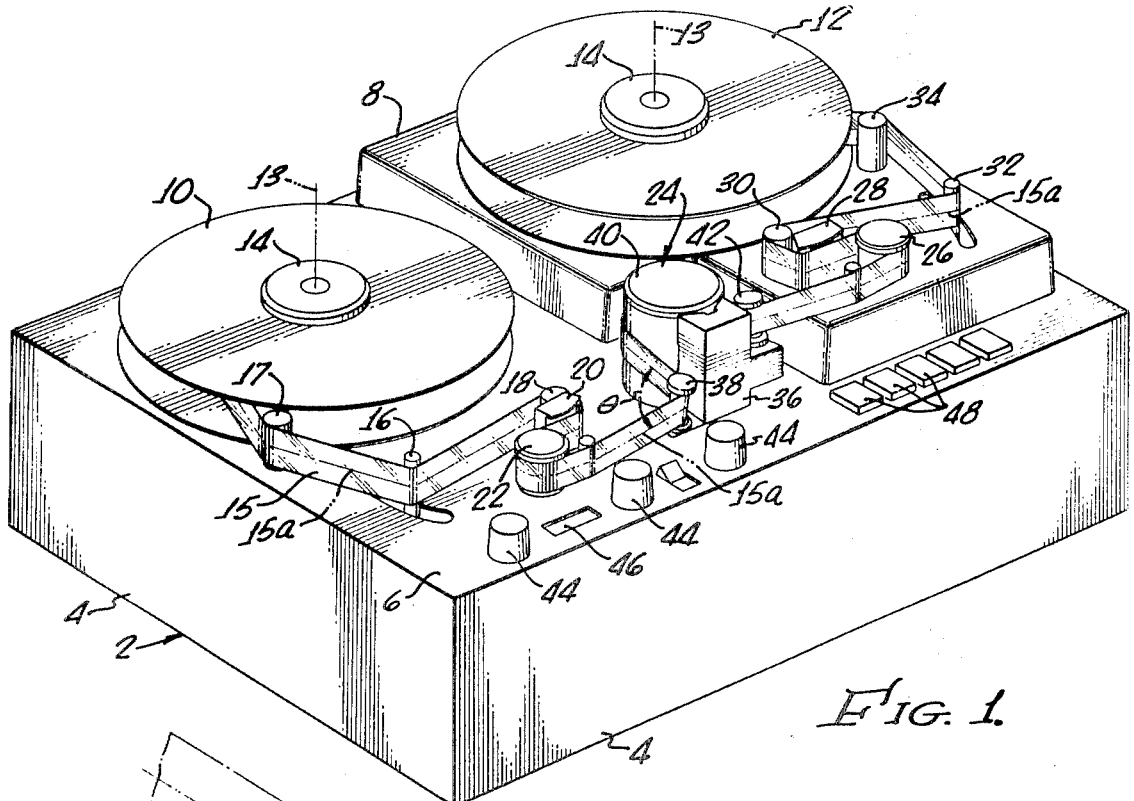
INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

June 23, 1970  A. R. MAXEY  3,516,146
METHOD OF ASSEMBLING A HELICAL SCANNING ASSEMBLY
Filed June 19, 1968  11 Sheets-Sheet 3
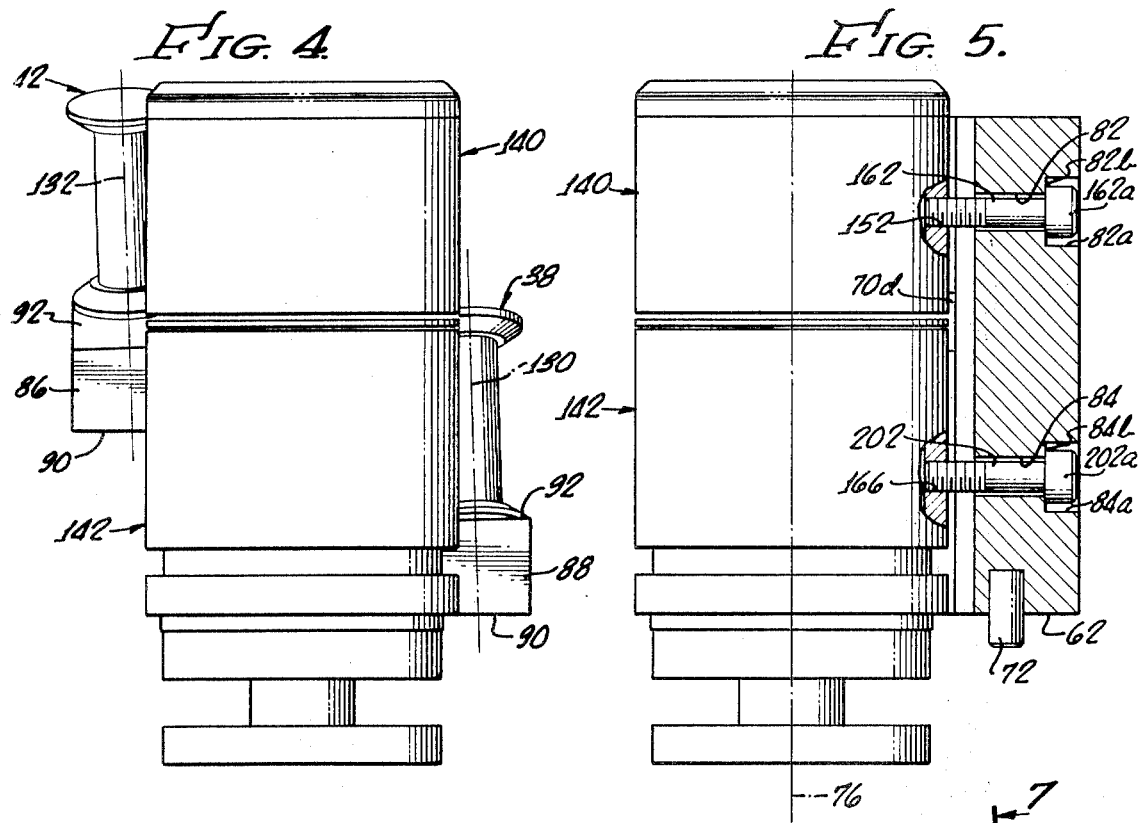
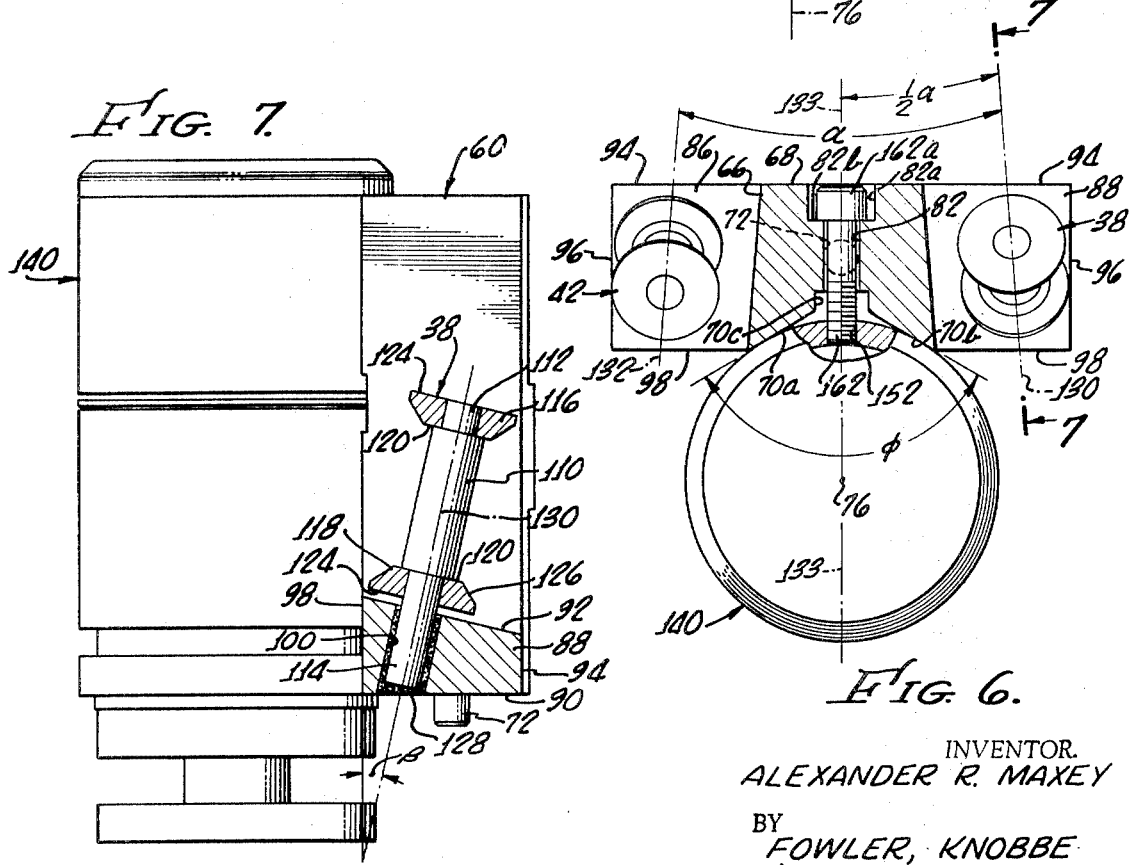
INVENTOR.
ALEXANDER R. MAXEY
BY
FOWLER, KNOBBE
& MARTENS
ATTORNEYS.

June 23, 1970   A. R. MAXEY   3,516,146
METHOD OF ASSEMBLING A HELICAL SCANNING ASSEMBLY
Filed June 19, 1968   11 Sheets-Sheet 4

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

June 23, 1970  A. R. MAXEY  3,516,146
METHOD OF ASSEMBLING A HELICAL SCANNING ASSEMBLY
Filed June 19, 1968  11 Sheets-Sheet 6
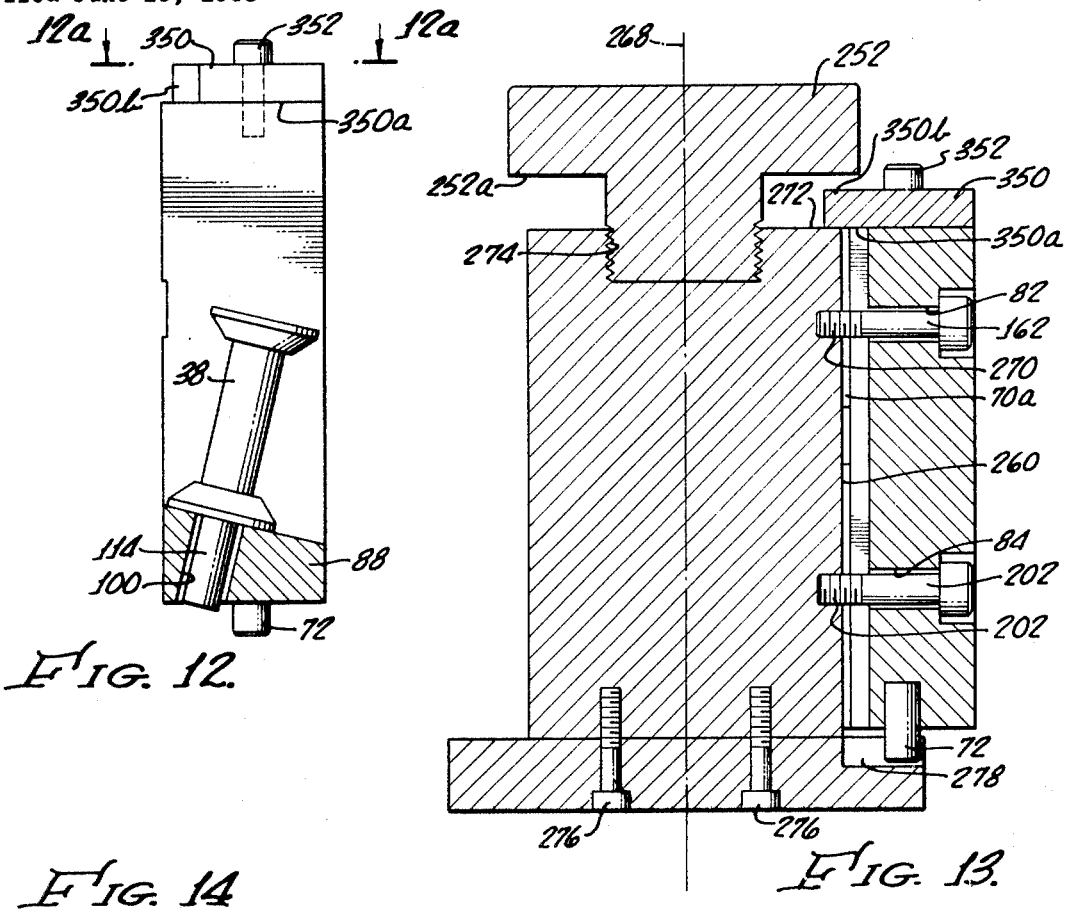
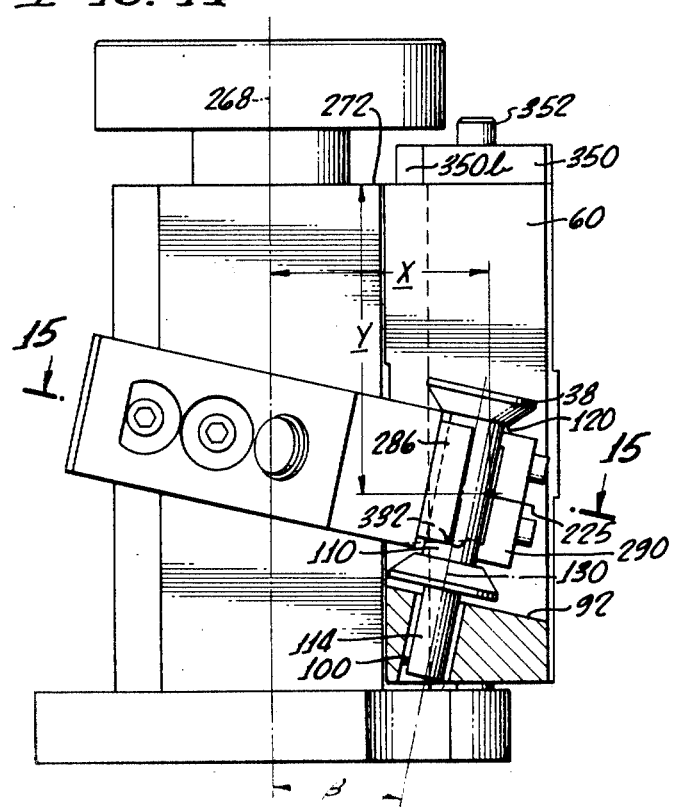
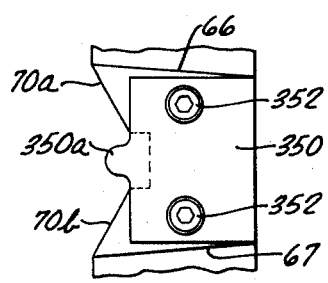
INVENTOR.
ALEXANDER R. MAXEY
BY FOWLER, KNOBBE
& MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY

BY
FOWLER, KNOBBE
& MARTENS
        ATTORNEYS.

INVENTOR.
ALEXANDER R. MAXEY
BY
FOWLER, KNOBBE
& MARTENS
ATTORNEYS.

3,516,146
METHOD OF ASSEMBLING A HELICAL SCANNING ASSEMBLY
Alexander R. Maxey, Newark, Calif., assignor to Westel Company, San Mateo, Calif., a corporation of California
Filed June 19, 1968, Ser. No. 738,250
Int. Cl. B23p *19/00*
U.S. Cl. 29—434                                21 Claims

ABSTRACT OF THE DISCLOSURE

A scanning assembly for a helical-wrap, drum-type, video tape machine includes entry and exit tape guides and a drum assembly interconnected by a bracket. The drum assembly includes upper and lower cylindrical male guides which butt against an elongate reference way on the bracket to align the axis of the drum assembly. The entry and exit guides are each mounted on the bracket oblique to the drum assembly axis by a pin which extends from the guide into an oversize bore in the bracket and is held in place by adhesive.

The drum assembly and guides are connected on the bracket in precisely the proper position to cause the tape to pass the scanner of the drum assembly at the proper angle and height by a method of assembly which includes connecting the bracket to a fixture with the way reference surfaces of the bracket abutting a cylindrical reference surface of the fixture and a reference plate on top of the bracket abutting a reference surface on top of the fixture. This fixes the bracket references in a known preselected position relative to guide positioning jigs on the fixture. The guide positioning jigs are used to mount the guides on the bracket in the desired relationship to the bracket reference surfaces, precise alignment of the guides being permitted by movement of the guide pins in the oversize bores before applying the adhesive. The bracket then is separated from the fixture and the upper and lower male guides are mounted on the bracket using the reference way and the reference plate to attain the desired relationship to the entry and exit guides.

Straightening posts on the tape recorder chassis are positioned relative to the scanning assembly using a jig, and the scanning assembly is then mounted on the chassis. Proper orientation of the scanning assembly is assured by an aligning pin on the underside o fthe bracket which cooperates with slots in the fixture and the chassis and corresponds to a pin on the straightening post positioning jig. The scanning assembly is held on the chassis by clamping disks.

BACKGROUND OF THE INVENTION

This invention relates to tape transport apparatus for video tape recording and/or reproduction equipment, and more particularly relates to a method for assembling and mounting the scanning assembly of a helical-wrap, drum-type video tape machine.

In a typical drum-type tape recorder, tape is transported past a tape entry guide which directs the tape up and around the drum in a helical path relative to the drum axis. The tape comes off the drum and is directed back to a path parallel with the transport by a tape exit guide. The drum includes a scanner or recording head which rotates in a plane perpendicular to the drum axis and traces successive signal paths diagonally across the moving tape helix. As is shown more fully in applicant's copending application Ser. No. 625,915 filed Feb. 27, 1967, for a Drum-Type Video Tape Recorder, the signal traces are very close together.

In order to achieve compatibility of the tape transport so that tape recorded on one machine can be replayed on the same machine or on other similar machines with the fidelity required for professional video equipment, it is critical that the tape helix pass the scanning line of the heads at precisely the proper angle and height, and that the angle and height of the tape across the scanning path be precisely the same from machine-to-machine. Inasmuch as the entry and exit tape guide surfaces set the path of the tape across the drum, the height and helix angle at which the tape crosses the scanning path is determined by the location and orientation of those tape guide surfaces in relation to the location and orientation of the drum assembly and the scanning path. Thus, for compatibility in a professional quality recorder, the tolerances which can be permitted in the location and orientation of the entry and exit tape guide relative to the location, and orientation of the drum assembly and scanning path are very small.

A scanning assembly within the desired tolerances can be manufactured in many ways, but there is a need for a design and method which is adapted to relatively easy manufacture and assembly on a mass production basis while remaining within the required close tolerances. Moreover, the head elements of the scanner in a video tape recorder often need replacement before the entire scanner. Therefore, the head element should be relatively easy to replace in the field without introducing errors outside the small allowable tolerances. In addition, the entire drum should be removable and replaceable on the scanning assembly without expensive tools or jigs and without introducing intolerable errors in the relationships of the parts.

SUMMARY OF THE INVENTION

To meet the above objectives applicant has invented a novel scanning assembly which has been made the subject of a divisional patent application, Serial No. 19,547, filed Mar. 19, 1970. The scanning assembly, which is also disclosed herein to help explain the present invention, includes a bracket having a pair of transverse flat surfaces forming an elongate way, entry and exit tape guides mounted on the bracket with their axes oblique to the length of the way, and a drum assembly mounted with its outer surfaces abutting the surfaces of the drum assembly along the length of the way.

In the preferred embodiment, the entry and exit tape guides are mounted on ears extending from the bracket by a pin extending from each guide into a respective oversize bore in one of the ears, and the pin is connected to the bore by adhesive. The preferred mounting means for the drum assembly are a pair of bolts extending through oversize apertures in the way portion of the bracket and connected to the upper and lower male guides of the drum assembly. The head of each bolt bears against the bracket to clamp the male guides to the flat surfaces of the way.

The present invention is directed to a method of assembling a scanning assembly of the above type.

In accordance with the methods of this invention, the bracket is connected to a fixture with reference means on the bracket cooperating with reference means on the fixture to fix the bracket reference means in a known preselected position relative to guide positioning reference means on the fixture, which are used to align the guides on the bracket at the desired location and orientation relative to the bracket reference means. The bracket, with the tape guides fixed thereon, is removed from the fixture, and the bracket reference means are used to mount the drum assembly on the bracket at the proper location and orientation relative to the tape guides.

In the preferred embodiment of the method, the guide aligning reference means of the fixture includes two sets of three transverse references surfaces. Each guide is butted against the three surfaces of one set to establish the proper orientation and location of the guide. The tape guides are clamped against the reference surfaces and the adhesive is applied with the guides clamped.

In addition to the two reference surfaces which form the way of the bracket, the bracket has a third reference surface perpendicular to the length of the way. When connecting the bracket to the fixture, the third reference surface is butted against a reference surface on the fixture to establish a height reference relative to the guide positioning references of the fixture. The third reference surface then is used to adjust the height of the drum relative to the guides.

The method of this invention provides a unique combination of ease of assembly and precise alignment. The entry and exit guides and the drum assembly can be connected together quite easily by the bracket, setting the location and orientation of the entry and exit tape guide surfaces precisely in relation to the orientation and location of the scanning path of the drum assembly. The tolerances permissible in the bracket dimensions are relatively high in comparison with the precise alignment required between the guides and the drum assembly. For example, the bores which receive the entry and exit guide pins need not be precisely located inasmuch as they are oversize in relation to the pins, and thereby permit adjustment of the guides to the precisely desired orientation and location. Similarly, the bores which receive the bolts clamping the upper and lower guide need not be precisely located inasmuch as they are oversize in relation to the bolts, thereby permitting adjustment of the upper and lower male guides to precisely the proper position.

Many of the dimensions of the entry and exit guide mounting fixture must be very precise. However, by virtue of the present invention a single fixture can be used to assemble any number of scanning assemblies, and therefore the cost of precise manufacture of the fixture is a very small factor in comparison with the savings the fixture permits in mass production of the scanning assembly.

These and other features and advantages of this invention will be apparent from the following detailed description of a specific embodiment when read with reference to the accompanying drawings.

BRIEF DESCRIPTION OF THE DRAWINGS

FIG. 1 is a perspective view of a video tape machine with a tape transport including a scanning assembly which may be assembled in accordance with this invention;

FIG. 2 is a perspective view of the scanning assembly removed from the video tape machine;

FIG. 4 is a rear elevation view of the scanning assembly;

FIG. 5 is a side elevation view of the scanning assembly with the bracket and a portion of the upper and lower male guides in section;

FIG. 6 is a plan view of the scanning assembly with a portion of the bracket and upper male guide in section;

FIG. 7 is a sectional view taken generally along the lines 7—7 of FIG. 6, i.e. the vertical plane including the entry tape guide axis, showing the entry tape guide and its relationship to the bracket and to the drum assembly which is shown in elevation;

FIG. 12 is a side elevation view of the bracket with one ear shown in section to illustrate the entry guide loosely mounted on the bracket in accordance with the method of this invention;

FIG. 12a is a partial plan view of the bracket taken generally along lines 12a—12a of FIG. 12 illustrating the relationship of the reference plate to the bracket way;

FIG. 13 is a vertical section through the fixture and bracket illustrating the method step of connecting the bracket on the fixture with their respective reference surfaces mating;

FIG. 14 is an elevation view of the fixture with the bracket mounted thereon taken parallel to the leg of the entry guide positioning jig and with one ear of the bracket shown in section to illustrate the relationship of the positioned entry guide to the bracket;

Figure 3:
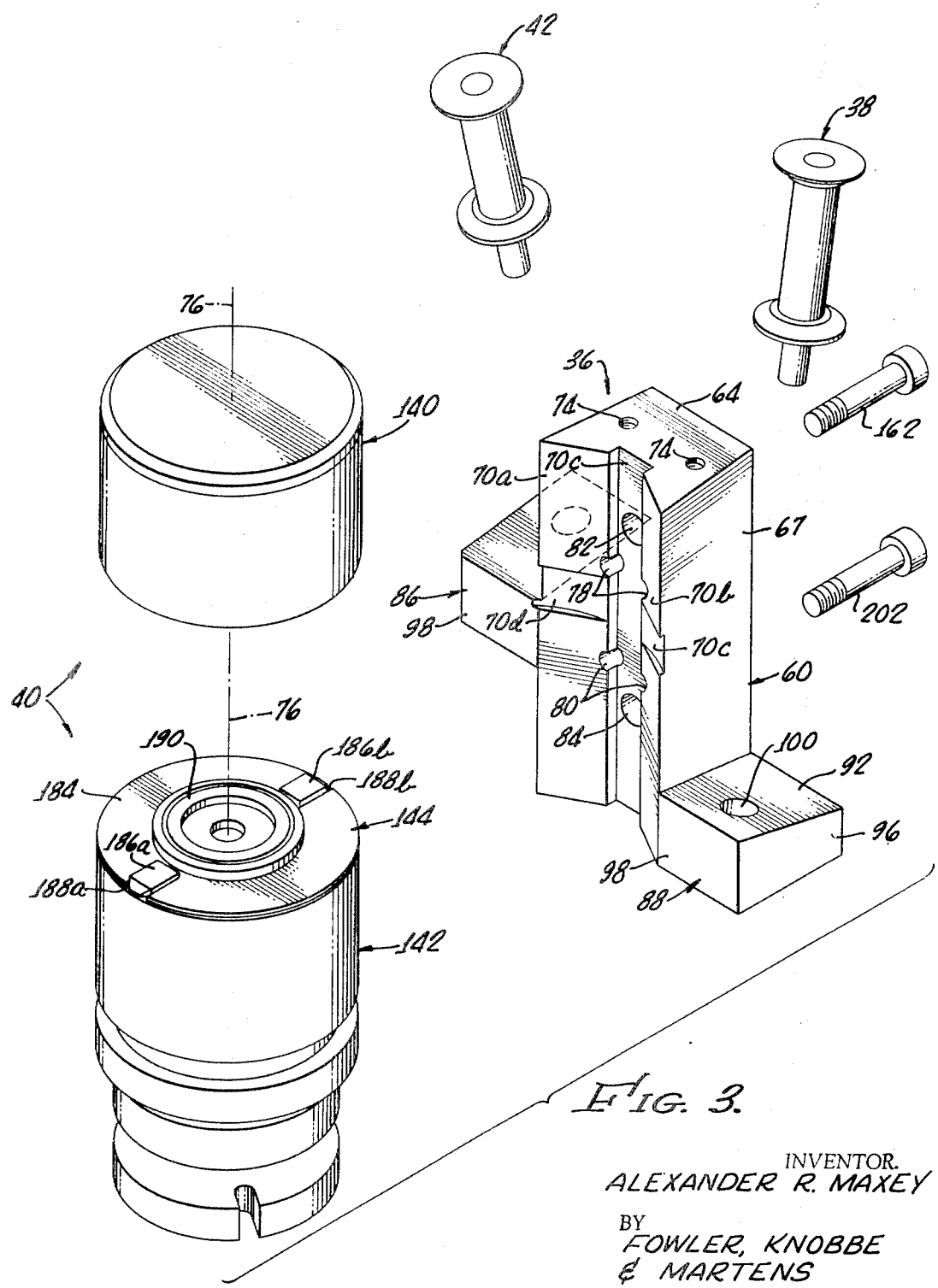
FIG. 3 is an exploded perspective view of the scanning assembly.

DETAILED DESCRIPTION OF A PREFERRED EMBODIMENT (a) Tape transport

Referring to FIG. 1, a helical scan video tape recorder whose scanning assembly may be advantageously assembled in accordance with this invention includes a case 2 generally in the form of a rectangular parallelepiped having four walls 4, a top 6, and a bottom, not shown. A platform 8 is raised above the level of the top. A tape supply reel 10 is mounted on the top and a tape take-up reel 12 is mounted on the platform. Each of the reels is mounted for rotation about an axis 13 of a respective hub 14 to transport tape 15 from the supply reel to the take-up reel. Although the transport can be oriented in other directions, for convenience in discussion the axis 13 of the reels will be considered to be vertical. In going from the supply reel 10 to the take-up reel 12, the magnetic tape contacts a guide 17, a supply tape tensioning device 16, a second guide 18, a first magnetic head assembly 20, a first friction surfaced capstan 22, a first straightening post 23, a scanning assembly 24, a second straightening post 25, a second friction surfaced capstan 26, a second magnetic head 28, another guide 30, a take-up tape tension device 32, another guide 34, and then goes onto the tape take-up reel. The scanning assembly 24 includes a bracket 36, an entry tape guide 38, a drum assembly 40, and an exit tape guide 42. The scanning assembly is disclosed herein only for sake of completeness and as an aid in explaining a method of assembly which is the invention claimed herein. As stated previously, the scanning assembly itself is the subject of a divisional patent application, Ser. No. 19,547, filed on Mar. 19, 1970 under Patent Office Rule 147.

The width of the tape portion between the supply reel and the first straightening post 23 and the width of the tape portion between the second straightening post 25 and the take-up reel are oriented vertically, and the longitudinal centerline 15a of those portions travels in a horizontal transport plane. The entry tape guide 38 is oblique to the vertical so that as the tape passes the entry tape guide, it is directed rearwardly and upwardly to pass helically around the drum assembly. The longitudinal centerline 15a of the tape remains in the horizontal transport plane between the first straightening post and the entry guide but the tape twists about its centerline during that portion of its path. The exit guide 42 is also obliquely oriented so that as the tape goes around the exit tape guide, it is directed back to a horizontal path. Thus, the longitudinal centerline of the tape again travels in a horizontal transport plane to the second straightening post, but the tape twists about its centerline between the exit guide and the straightening post to again orient the tape vertically.

(b) Scanning assembly bracket

Referring to FIGS. 3, 5, and 6, the bracket 36 of the scanning assembly includes an upright, elongate, body 60 having a bottom 62, a flat, horizontal top 64, two upright side surfaces 66 and 67, an upright front surface 68 and a back surface 70. An aligning pin 72 is press-fit into a bore in the bottom of body and protrudes downward. The pin 72 is parallel to the surfaces 70a and 70b and centered between those surfaces. The top surface 64 has a pair of threaded bodes 74, formed therein. In the illustrated embodiment, the side surfaces 66 and 67 converge slightly in the forward direction.

The rear surface of the bracket body includes a pair of flat vertical drum assembly reference surfaces 70a and 70b. The drum assembly reference surfaces are transverse, converging forwardly at an angle $\phi$, which in an exemplary embodiment is about 120°, to form an elongate centering way of generally V-shaped cross-sectional configuration.

A longitudinal groove 70c, shown to be of generally rectangular cross-sectional configuration, extends along the length of the body between the pair of converging reference surfaces 70a and 70b. A pair of horizontally disposed arcuate recesses 70d and 70e are at a common height and have a common center located on the vertical axis 76 of the drum assembly. A pair of wire-receiving apertures 78 extend front to rear through the body above the arcuate recesses, and another pair 80 are located below the recesses. A pair of bores 82 and 84, also extending front to rear through the body, are located in the elongate slot 70c above and below the recesses 70d and 70e. Each of the bores 82 and 84 is counter-bored at its forward end 82a and 84a.

Referring to FIGS. 3, 4, and 7, a pair of ears 86 and 88 extend outwardly from the sides 66 and 67 respectively of the bracket body and are formed integrally with the body. One ear 88 is located at the lower end of one side 67 while the other ear 66 is located near the midportion of the opposite side 66. Each of the ears has a bottom 90, a top 92, and upright front 94, side 96 and rear 98 walls. The top surface of the lower ear 88 slopes down forwardly and slightly inwardly, while the top surface of the upper ear slopes down rearwardly and slightly outwardly. A bore 100 extends through each of the ears generally perpendicular to its top surface.

In one actual embodiment, the bracket is fabricated from an aluminum alloy, hard anodized. Prior to anodizing, the vertical drum assembly reference surfaces 70a and 70b are finish-machined to be quite flat.

(c) Entry and exit guides

The entry 38 and exit 42 tape guides are non-rotatable. As the two are identical, only the entry tape guide will be described in detail. Referring to FIG. 7, the guide include a body having a central cylindrical portion 110 and reduced diameter pins 112 and 114 extending from its opposite ends. The cylindrical exterior surface of the central portion is a low-friction tape guide surface. The upper 112 and lower 114 pins are fitted into bores in upper 116 and lower 118 flanges. Each of the flanges includes a centrally disposed surface 120 which faces a respective shoulder of the body formed at the change of diameter. The central surfaces 120 are slightly larger in diameter than the tape guide surface 110 to form a tape retaining shoulder at each end of the tape guide surface. The outer face 124 of each flange is shown to be relatively flat while the side walls 126 are bevelled for ease in threading of the tape. The lower pin 114 of each guide extends a substantial distance beyond the lower flange 118, into the bore 100 in the ear of the bracket. The bore 100 is larger in diameter than the pin 114 and the pin is fixed in the bore by adhesive 128. The tape guide is mounted with the lower flange 118 spaced slightly above the top surface 92 of the ear.

As shown in FIG. 6, the axis 130 of the entry guide and the axis 132 of the exit guide are in vertical planes which converge forwardly at an angle $\alpha$. In one actual embodiment, for example, the angle $\alpha$ is about 10° so that the tape wraps around the drum through a horizontal angle of about 190°. The entry and exit guides are centered with regard to a vertical plane 133 passing through the drum assembly axis 76, the center of the bracket way 70a, and 70b and the center of the aligning pin 72. Referring to FIG. 7, the axis 130 of the entry guide is inclined at a vertical angle $\beta$. The axis 132 of the exit guide is inclined at the same vertical angle, but in the opposite direction. Thus, the axes 130 and 132 are disposed obliquely to the axis 76 of the drum assembly.

(d) Drum assembly

Figure 25:
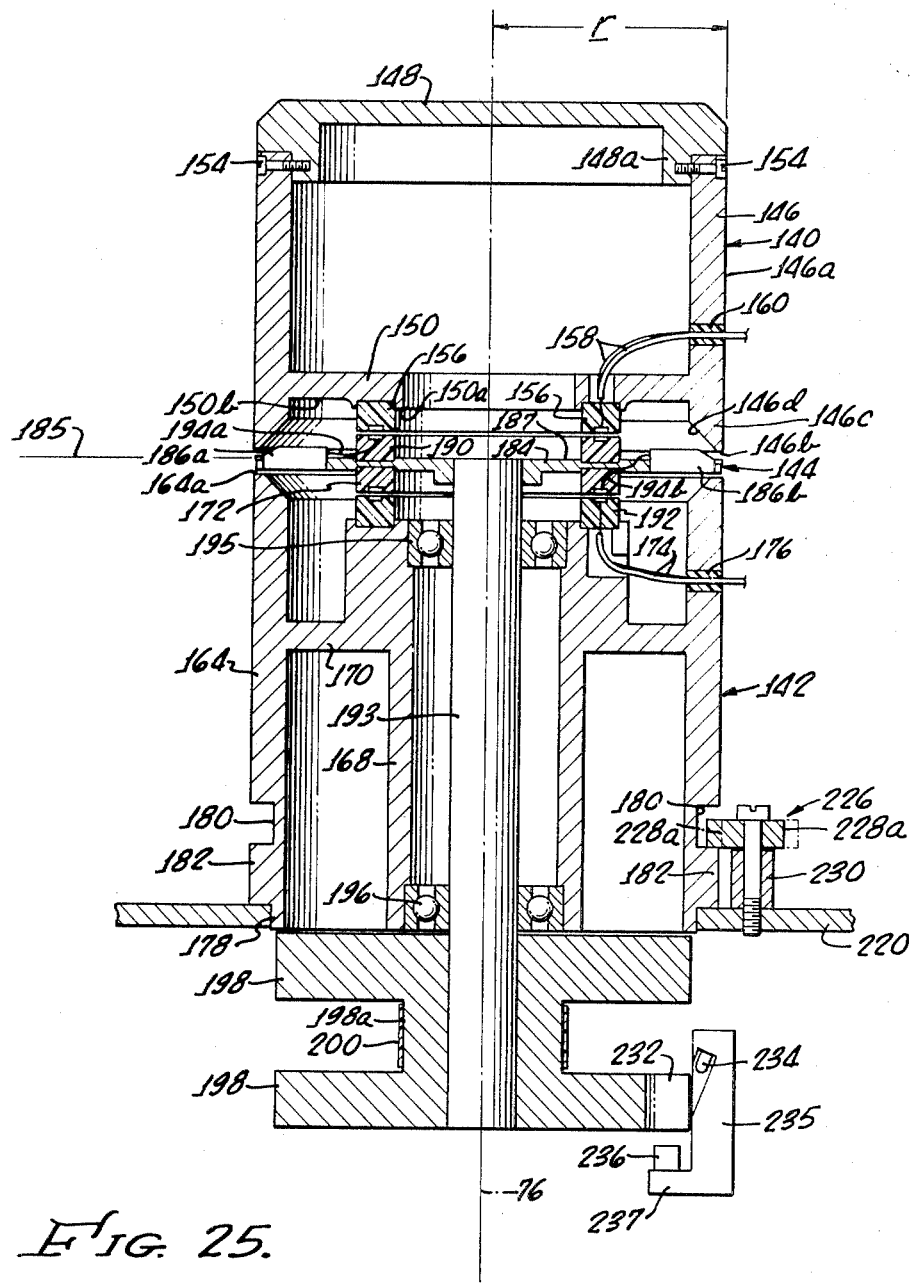
FIG. 25 is a vertical section through the drum assembly of the scanning assembly mounted on the chassis plate.

As shown in FIGS. 3 and 25, the drum assembly includes an upper male guide 140, a lower male guide 142, and a scanner 144 all having a common vertical axis 76.

The upper male guide 140 is hollow, having a cylindrical side wall 146 of a radius r, a circular cap 148, and an annular bottom wall 150. The cylindrical exterior surface 146a of the male guide is a low-friction surface at least a portion of which is a tape guide surface. The lower edge 146b of the side wall extends below the bottom wall 150 to define a peripheral depending flange 146c. The inner wall 146d of the flange is bevelled, terminating at the periphery in a relatively sharp edge 146b. A threaded bore 152 (see FIG. 5) is formed radially in the cylindrical surface of the guide in line with the upper bore 82 in the bracket.

The cap 148 is removably mounted on the upper male guide by machine screws 154 extending through the side wall into a flange 148a on the cap. The bottom face of the upper male guide includes an annular land area 150a surrounded by an annular recess 150b. One of the windings 156 of a rotary transformer is mounted in an annular recess formed in the land area, and is electrically connected to a pair of wires 158 extending out through apertures 160 (only one is shown) in the cylindrical wall and thence through the apertures 78 in the bracket.

Referring to FIGS. 2, 5, and 6 the upper male guide 140 is mounted with its exterior cylindrical surface butted against the upper portion of the pair of flat, vertical, drum assembly reference surfaces 70a and 70b on the bracket so that the axis 76 of the male guide is positioned by cooperation of the guide 140 and the V-shaped way. A bolt 162 extends through the upper bore 82 of the bracket and is threaded into the bore 152 in the upper male guide. The bore 82 in the bracket is larger in diameter than the bolt 162, to permit adjustment, and the bolt head 162a butts against the recessed shoulder 82b at the end of the counter bore portion 82a to clamp the upper male guide tightly to the bracket against the reference surfaces 70a and 70b.

Referring to FIGS. 3 and 25, the lower male guide 142 also is hollow and includes a low-friction cylindrical side wall 164 of a radius r equal to the radius of the upper male guide, a portion of which is a tape guide surface, and having a threaded bore 166 (FIG. 5) aligned with the lower bore 84 through the bracket. The upper edge of the cylindrical wall is bevelled to provide a relatively sharp edge 164a spaced slightly from the edge 146b of the upper male guide. An upright cylindrical housing section 168 is connected to the cylindrical wall by a floor 170. One winding 172 of a second rotary transformer is mounted in an annular recess formed at the upper end of the housing, and a pair of wires 174 electrically connected to that winding extend out of the lower male guide through a pair of apertures 176 (only one shown) and thence through the apertures 80 in the bracket. A reduced diameter lip 178 is formed at the bottom end of the lower male guide, and a reduced diameter retaining groove 180 is spaced slightly above the lip by an annular flange 182.

The scanner includes a circular plate 184 disposed between the upper and lower male guides, and slightly spaced from the edges 146b and 164a. A pair of record-reproduce heads 186a and 186b are mounted in peripheral openings 188a and 188b spaced 180° around the plate 184. The recesses 70d and 70e of the bracket (FIG. 5) are level with the heads to provide clearance. The second winding 190 of the first rotary transformer is mounted in an annular recess in the upper side of the plate, and the second winding 192 of the second rotary transformer is mounted in an annular recess on the lower face of the plate. Each of the windings 190 and 192 is connected electrically to a separate one of the heads 186a or 186b by a pair of wires 194a or 194b. Conventional electrical circuits (not shown) for recording and/or reproducing video information may be coupled to the wires, hence through the rotary transformer windings to the record-reproduce heads.

The scanning plate 184 is mounted on the upper end of a shaft 193 which is rotatably mounted in bearings 195 and 196 in the housing section 168 of the lower male guide. The lower end of the shaft extends beyond the sleeve and has a flywheel 198 mounted thereon. A belt 200 connected in a pulley groove 198a formed in the flywheel is connected to a motor, not shown, to rotate the scanner. As the scanner rotates, the heads trace a circular scan path at the level 185. The top surface 187 of the plate 184 is parallel to the plane 185 of the scan path, and is located at a precisely known height relative to the scan level.

Referring to FIGS. 2 and 5, the lower male guide and scanner subassembly is mounted on the bracket by a bolt 202 extending through the lower oversize bore 84 in the bracket. As with the upper male guide, the bolt 202 is threaded into the bore 166 in the lower male guide and the bolt head 202a abuts the shoulder 84b at the end of the counter-bore portion to hold the upper male guide tightly in position against the bracket reference surfaces. As the upper and lower male guides are of the same diameter and both are held tightly against the self-centering V-shaped way, the male guides and the scanner have a common axis 76 parallel to the drum assembly reference surfaces 70a and 70b.

Figure 23:
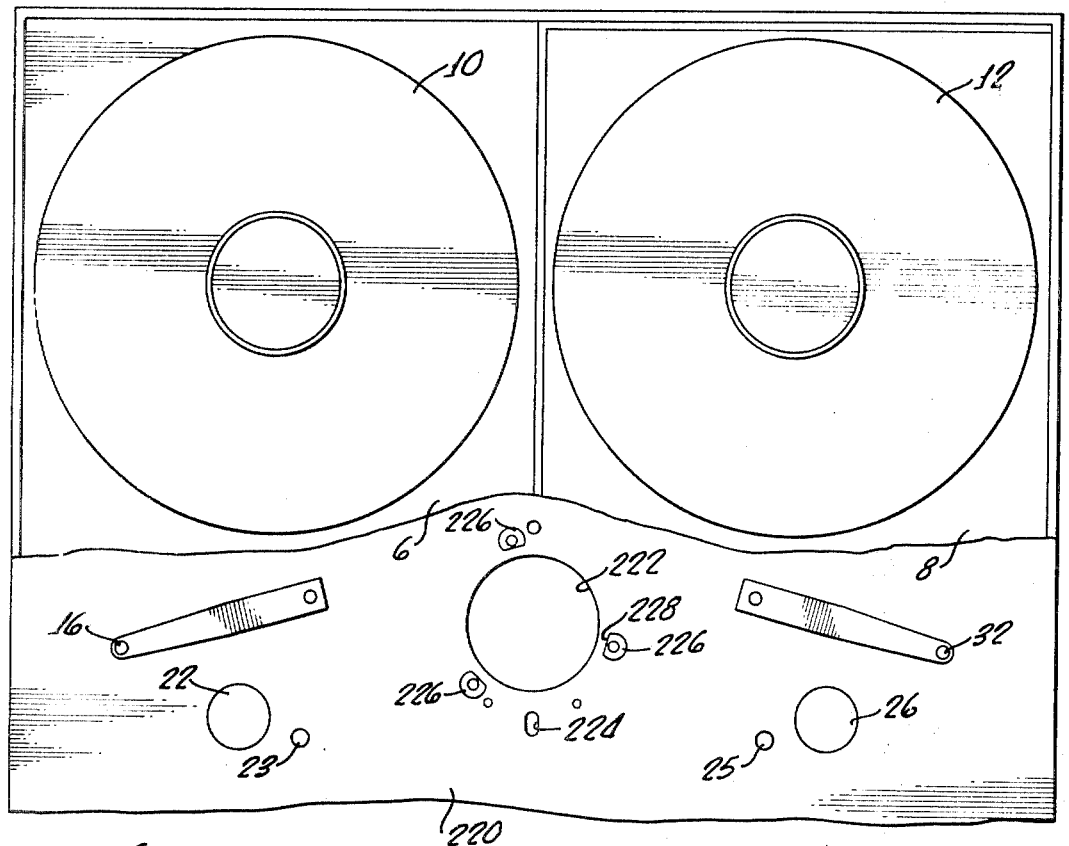
FIG. 23 is a partial plan view of the tape machine with a portion of the top and platform removed to show part of the chassis plate.

Referring to FIGS. 23 and 25, the scanning assembly is mounted on a chassis plate 220 fixed to the recorder case 2 and disposed below the top 6 of the case. The lip 178 of the lower male guide extends through a circular aperture 222 in the chassis plate and the flange 182 rests on the chassis plate. The diameter of the aperture 222 is similar to the diameter of the lip 178. The aligning pin 72 on the bracket extends into an oblong slot 224 in the chassis plate disposed adjacent the aperture. The width of the slot 224 is similar to the width of the aligning pin 72. Three clamps 226 disposed around the periphery of the aperture each include a clamping disk 228 which in plan view is a truncated circle with one flattened side 228a. Each of the clamping disks is mounted on the chassis plate by a bolt 230. When the disks are turned so that the flat side 228a is disposed away from the drum assembly, the disks extend into the groove 180 and bear down on the upper side of the flange 182 to hold the drum assembly in place. With the clamp disks turned so that the flattened portion faces the drum assembly, as shown in FIG. 23, and in phantom in FIG. 25, the disks do not overlay the flange 182.

The lower element of the flywheel 198 includes at least one radial slot 232 on its periphery. A lamp 234 and a photocell 236 are mounted on the chassis on a L-shaped bracket having an upright leg 235 alongside the flywheel and a horizontal leg 237 below the flywheel. The lamp light normally is blocked from the cell 236 by the flywheel, so that the photocell is activated only when passed by the slot 232. Thus, the rotary position of the scanner is identified at least once each revolution by the light beam striking the photocell.

(e) Guide setting fixture

Figure 8:
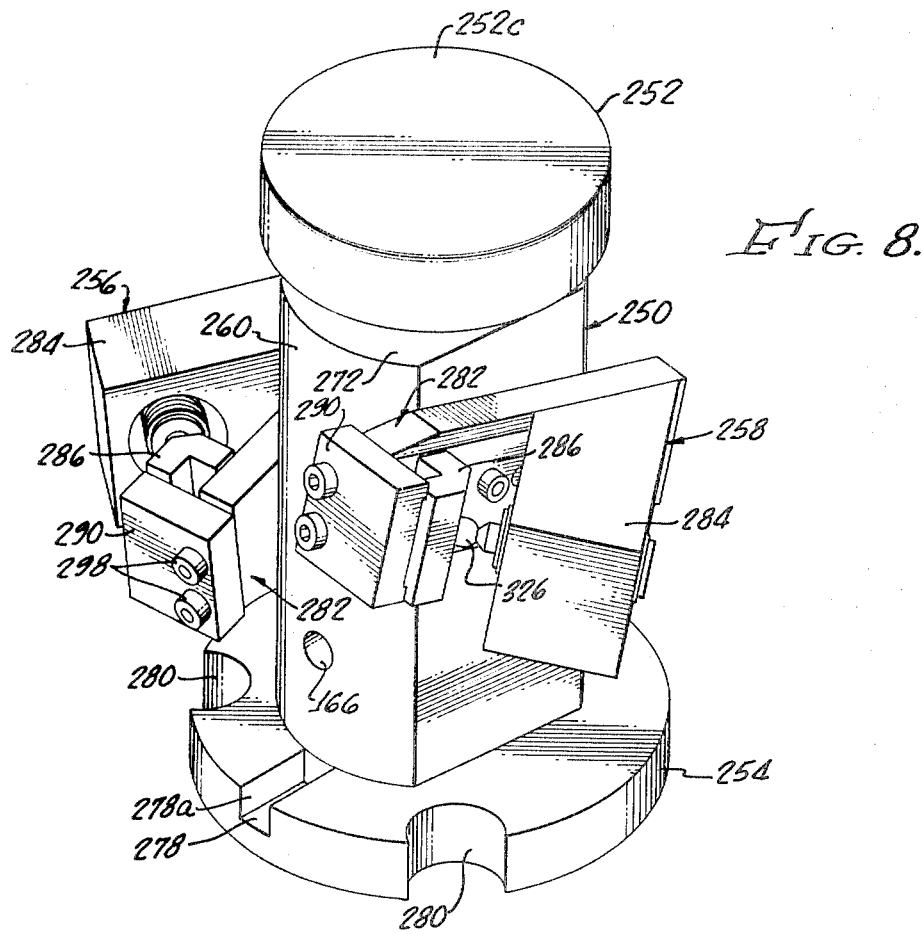
FIG. 8 is a perspective view of the fixture used in the method of this invention.

Referring to FIG. 8, a guide setting fixture for use in mounting the entry and exit tap guides on the bracket in accordance with the present invention includes a body 250, a cap 252, a base 254, an entry guide positioning jig 256 and an exit guide positioning jig 258.

Figure 9:
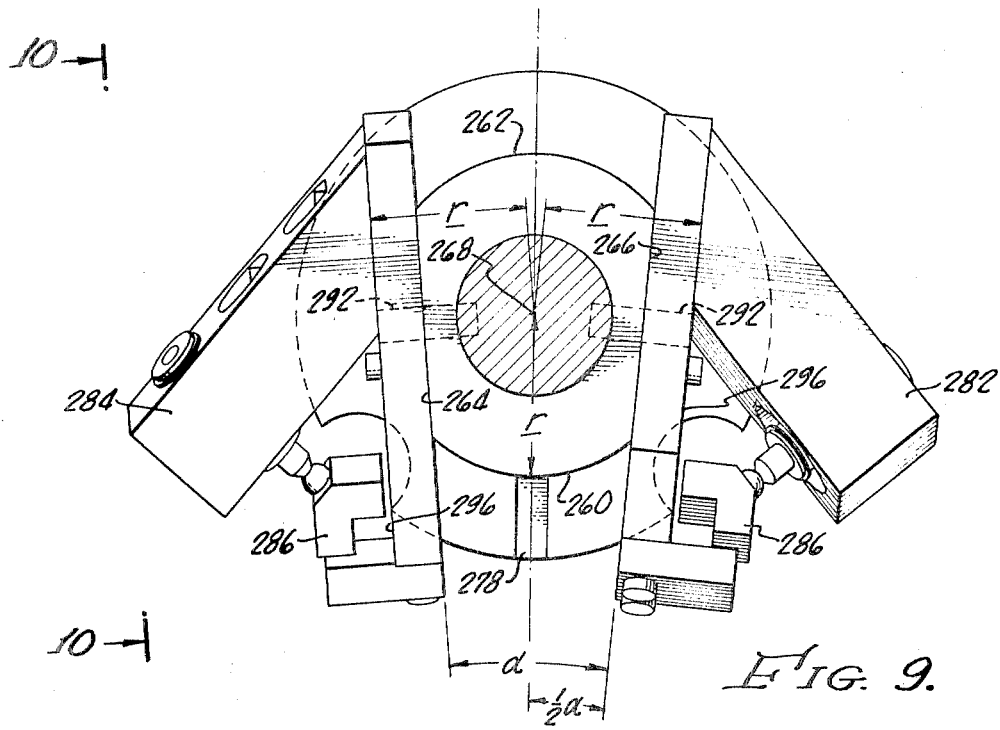
FIG. 9 is a plan view of the fixture taken generally along the lines 9—9 of FIG. 10.

As is shown in FIGS. 8, 9, and 13, the body of the fixture has a front wall 260, a rear wall 262, and two side walls 264 and 266. The front and rear wall form segments of an upright cylinder having a vertical axis 268 and a radius r, the same as the radius r of the upper and lower male guides of the scanning assembly. The forward curved wall has a pair of threaded bores 270 therein. The side walls 264 and 266 are vertical and flat, in plan view forming chords of the cylinder, and converge in the forward direction. The top 272 of the body is perpendicular to the axis 268 and is flat except for a central large threaded bore 274 in which the cap is threaded. The lower surface 252a of the cap is spaced a substantial distance above the top 272 of the body to leave a portion of the body top exposed. The guide setting fixture is disclosed herein only for sake of completeness, and to aid in explaining a method of assembly with which it may be used. The fixture itself is the subject of a divisional patent application, Ser. No. 24,973, filed on Mar. 19, 1970, under Patent Office Rule 147.

The base 254 is secured to the body by screws 276 extending through counter-sunk bores in the base into the bottom of the body. A slot 278 in the upper surface of the base is disposed radially with respect to the axis 268 and extends through a portion of the depth of the base from the periphery inwardly adjacent the curved front wall 260 of the body. The vertical side walls 278a of the slot are parallel and are spaced apart by precisely far enough to receive the aligning pin 72 protruding from the bottom of the bracket. The base also has a pair of semi-circular cutouts 280 formed in its periphery on opposite sides of the slot 278.

Referring to FIGS. 8–11, each of the two guide positioning jigs 256 and 258 includes a guide reference member 282, a saddle suport arm 284, and a movable saddle block 286. As the two jigs are identical in most of their details, although opposite hand, the following description of the jig structure will apply to both except where noted.

Each guide reference member includes an elongate positioning leg 288 and a short positioning foot 290. The leg is of generally rectangular cross-sectional configuration, having one side 288a butted against a flat side of of the fixture body. A dowel 292 extends from the body into the leg and a screw 294 extends through the leg and is threaded into the body to fix the leg on the body. The opposite sides 296 of the leg has a longitudinal central recess 296a formed therein, leaving two relatively narrow strips 296b along the top and bottom edge portions.

The faces of the two strips define a reference surface 296b in a vertical plane a distance r, equal to the radius r of the drum assembly, from the axis 268. The central recess 296a reduces the area of the reference surface 296b which must be precisely machined. As is shown in FIG. 9, the vertical plane of the entry jig reference surface 296b converges forwardly with the vertical plane of exit jig reference surface 296b at an angle $\alpha$, the same as the angle $\alpha$ between the vertical planes including the entry guide axis 130 and exit guide axis 232. The slot 278 is centered between those vertical planes.

The positioning foot 290 is mounted at the forward end of the leg by a pair of screws 298, so that the foot extends perpendicularly outward from the leg, and the foot and leg together define an L-shaped configuration. The foot also is of a generally rectangular cross-sectional configuration with the central portion 300a of one side 300 recessed leaving a raised reference surface 300b defined by a pair of strips at the outer edge portions. The reference surface 300b is a plane perpendicular to the plane of the leg reference surfaces 296b.

Figure 11:
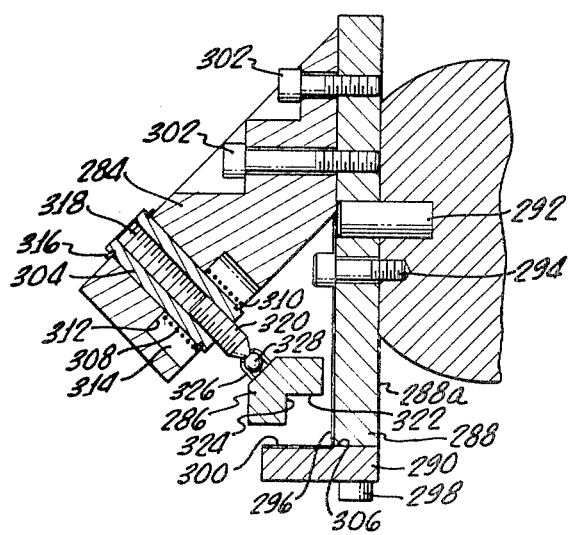
FIG. 11 is a partial sectional view through the entry guide positioning jig of the fixture taken generally along lines 11—11 of FIG. 10.

Referring to FIG. 11, the sadde support arm 284 is connected to the positioning leg near the rear thereof by a pair of bolts 302, and extends outwardly and forwardly away from the leg. A hollow sleeve 304 is slideably mounted in a bore through the saddle support arm near its forward end. The sleeve is aimed toward the interior corner 306 formed by the L-shaped reference member. A coil spring 308 surrounding the forward portion of the sleeve is held between a retaining ring 310 on the forward end of the sleeve and a shoulder 312 formed on the arm by an enlarged diameter forward portion 314 of the bore. The spring 308 urges the sleeve toward the corner 306 of the reference member. A retaining ring 316 at the rear end of the sleeve prevents the sleeve from falling forwardly out of the bore. The inner wall 318 of the sleeve is threaded and a headless screw 320 is inserted therein.

The saddle block 286 is an L-shaped member having a pair of transverse aligning surfaces 322 and 324. The saddle block is mounted on the arm by a socket 326 which receives a ball 328 formed on the end of the screw to provide a ball and socket universal joint.

Figure 10:
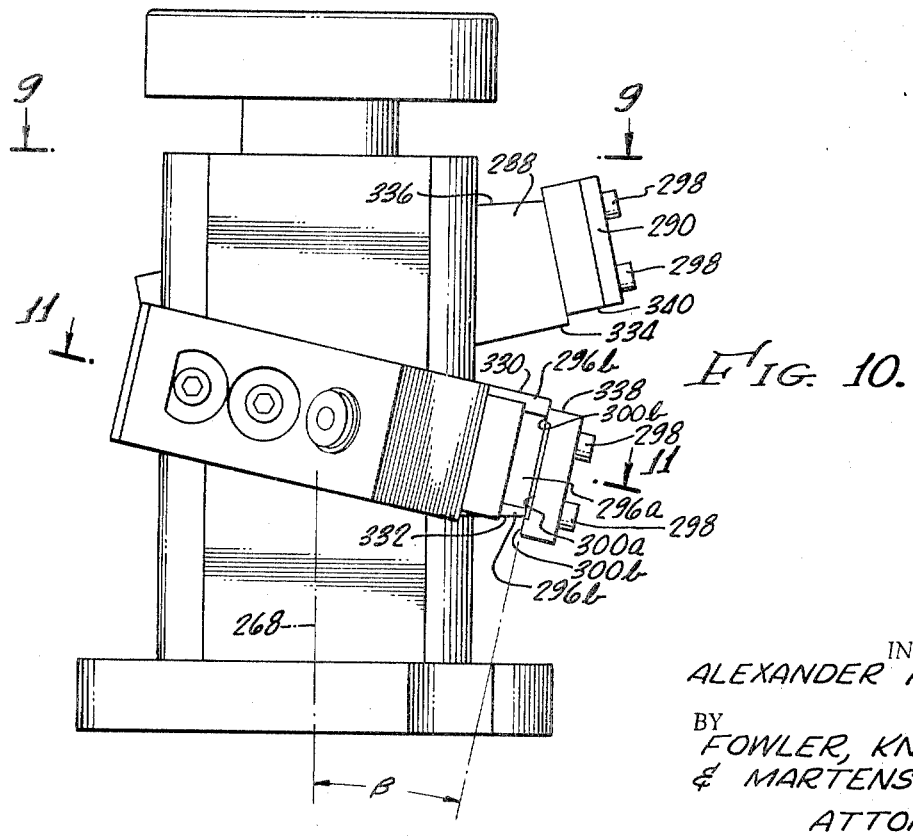
FIG. 10 is an elevation view of the fixture taken generally along the lines 10—10 of FIG. 9 parallel to the leg of the entry guide positioning jig.

The support arm of the entry guide mounting jig is mounted on the body so as to slope downwardly in the forward direction, whereas the exit guide mounting jig slopes upwardly in the forward direction. As is shown in FIG. 10, the position of the entry guide mounting jig 256 relative to the body is such that the reference surface 300b of the positioning foot is inclined at a vertical angle $\beta$ relative to the axis of the body. As can be seen from FIG. 17, the foot reference surface 300b of the exit guide mounting jig 258 also is disposed at a vertical angle $\beta$ relative to the axis of the body.

As is shown in FIG. 10, the arm of the entry guide mounting jig has a flat upper reference surface 330 while its lower surface 332 is chamfered at the forward end so that the forward portion is substantially horizontal. The arm of the exit guide mounting jig, on the other hand, has a flat lower reference surface 334 while its upper surface 336 is chamfered so as to be substantially horizontal at the forward end. The upper surface 338 of the positioning foot of the entry guide mounting jig is spaced slightly below the upper flat surface 330 of the arm, while the foot of the exit guide mounting jig has its lower surface 340 spaced slightly above the lower surface 334 of the arm.

(f) Method of assembly in accordance with the invention

Referring to FIGS. 12, 12a, and 13, assembly is begun by placing the entry 38 and exit 42 tape guides on the bracket, extending the lower pin 114 of each loosely into the oversize bore 100 in a respective one of the ears 86 or 88. A reference plate 350 having a flat bottom 350a is connected on top of the bracket by screws 352 extending through the reference plate and into the threaded bores 74 in the bracket top. A tab portion 350b of the reference plate overhangs the V-shaped way of the bracket.

Referring to FIG. 11, the saddle blocks 286 are moved back toward the saddle support arms 284 by backing-off the screws 320. In addition, the foot 290 is removed from each positioning leg 288.

As is shown in FIG. 13, the bracket with the reference plate 350 secured thereon and the entry and exit tape guides 38 and 42 loosely mounted thereon is then placed on the guide setting fixture with the flat vertical flat drum assembly reference surfaces 70a and 70b of the bracket butted against the forward curved wall 260 of the fixture body, the underside of the reference tab 350b butted on the forward top surface 272 of the fixture body, and the aligning pin 72 depending into the slot 278 in the base of the fixture. As the feet 290 are not in place and the saddle blocks 286 are backed-off, the bracket can be mounted on the fixture without the saddle blocks or the positioning feet interfering with the entry and exit guides which are loosely mounted on the bracket. The bolts 162 and 202 are then inserted through the oversize bores 82 and 84 in the bracket and threaded into the fixture bores 270 to securely fasten the bracket to the fixture. The reference surface on the tab 350b, and the vertical drum assembly reference surfaces 70a and 70b are then fixed in the desired position relative to the reference surfaces 296b, 300b, 330, and 334 of the two guide positioning jigs. In addition the bracket is oriented in plan view so that the aligning pin is centered between the reference surfaces 296b.

Figure 15:
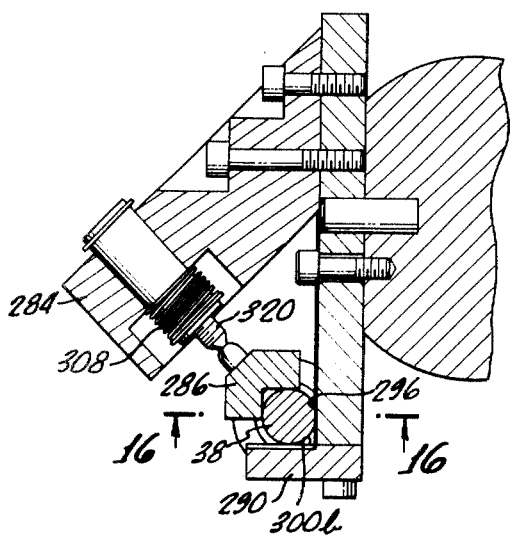
FIG. 15 is a partial section through the entry guide positioning jig taken generally along the lines 15—15 of FIG. 14 to illustrate the step of positioning the entry guide and clamping it in position.
Figure 16:
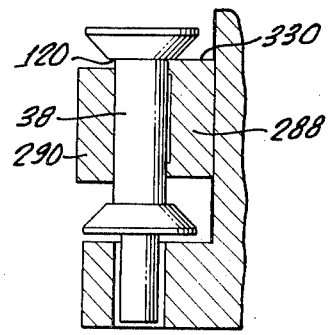
FIG. 16 is a partial sectional view through the entry guide, ear, and positioning jig taken generally along lines 16—16 of FIG. 15.

The positioning feet 290 are then replaced on the end of their respective legs, and the saddle blocks 286 are advanced by turning the screws 320 so that the saddle blocks push the entry and exit guides against the reference surfaces 396b and 300b of the positioning legs and feet as shown in FIGS. 14 and 15. The springs 308 assure that the saddle blocks apply pressure without damaging the surface of the guides. As shown in FIGS. 14 and 16, while advancing the saddle blocks, the entry tape guide 38 is held so that the shoulder 120 on its upper flange rests on the upper reference surface 330 of the positioning leg. Thus, when the saddle block is fully advanced, the relationship between the reference surface on the tab 350b and the axis of the fixture body 268 relative to the position of the entry tape guide with regard to the orientation and location of its axis 130 is set by the three reference surfaces 296b, 300b and 330 of the positioning leg and foot. The axis 130 of the entry guide is at the vertical angle β with the fixture axis 268. A line 225 on the plane defined by the surfaces 300b at the level which represents the centerline of the tape entering the entry guide, is spaced from the fixture axis 268 by a dimension x and below the fixture body top 272 by a dimension y. As the entry guide is slightly spaced above the top surface 92 of the ear, and the bore 100 is larger in diameter than the pin 114, the desired relationships are achieved even though the bore 100 and the top surface of the ear may not be located in precisely the same place from one bracket to the next.

Figure 17:
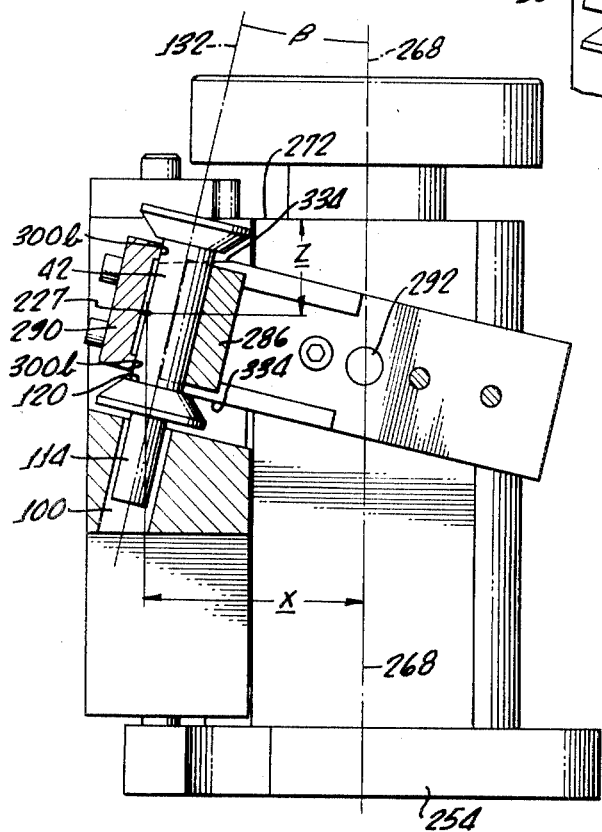
FIG. 17 is an elevation view of the fixture with the bracket and exit guide mounted thereon, taken parallel to the leg of the exit guide positioning jig with the arm of the jig removed and with one bracket ear and the foot of the exit guide jig in section.

The same procedure is followed with the exit tape guide 42 except that the height of the guide is determined by butting the lower flange against the lower reference surface 334 of the positioning arm as shown in FIG. 17. The axis 132 of the exit guide then is also at the angle β to the fixture axis 268 and the line 227 representing the centerline of the exiting tape is spaced from the centerline by a dimension x and from the fixture top by a dimension z.

Figure 18:
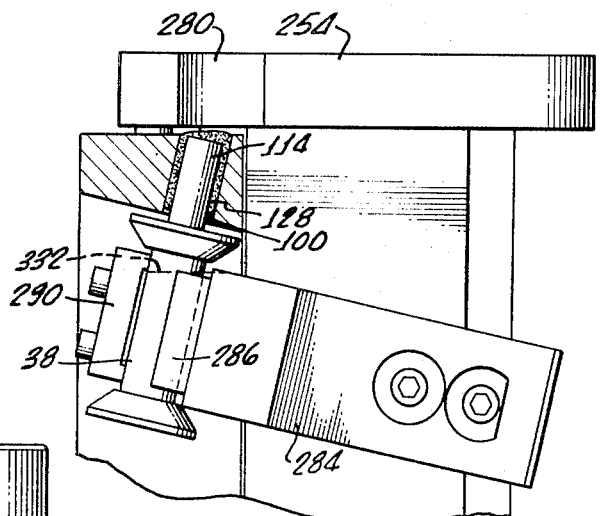
FIG. 18 is a partial elevation view of the fixture with the bracket and guides mounted thereon illustrating the fixture inverted and the adhesive applied, with one ear in section to illustrate the placement of the adhesive.

With the saddle blocks locking the entry and exit tape guides firmly in position against the reference surfaces of the guide positioning jigs, the fixture is inverted as shown in FIG. 18 to stand on its cap, and adhesive 128 is applied in the bores 100 to fix the pins 114 of the guides to the bracket in the precisely aligned position. The cutouts 280 in the base of the fixture provide access to the bore for applying the adhesive.

After the adhesive has set, the saddle blocks are backed-off, the foot 290 is removed from each of the guide positioning jigs, the bolts 162 and 202 are removed so that the bracket is no longer connected to the fixture, and the bracket, with the entry and exit guides fixed on it, is removed from the fixture. As can be seen in FIGS. 14 and 17, the champhered surfaces 332 and 336 on the entry and exit guide positioning legs permit the flanges of the guides to readily pass the legs without interference.

The next step in the method is mounting the lower male guide and the scanner on the bracket. Prior to that step, the scanner, including the scanning plate 184, shaft 193, and flywheel 198, is mounted on the lower male guide 142 as illustrated in FIG. 25 to form a lower drum sub-assembly which includes all of the drum assembly except the upper male guide 140. The lower drum subassembly is then placed on hte bracket using a reference biscuit 360 to position it with regard to height.

Figure 19:
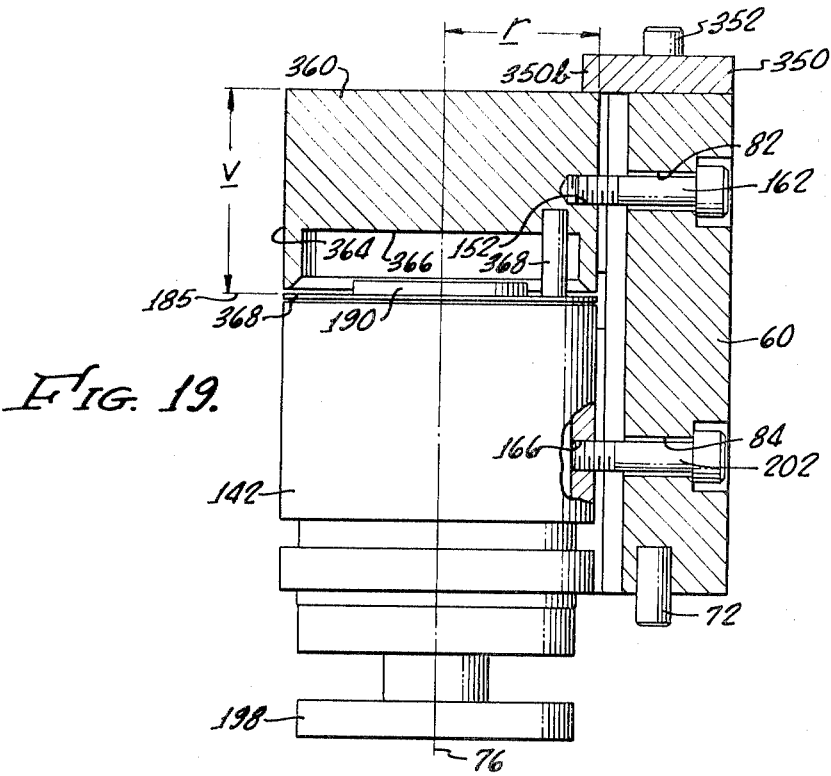
FIG. 19 is an elevation view partially in section illustrating the step of placing the lower male guide and scanner sub-assembly on the bracket using the reference plate and the reference biscuit.
Figure 20:
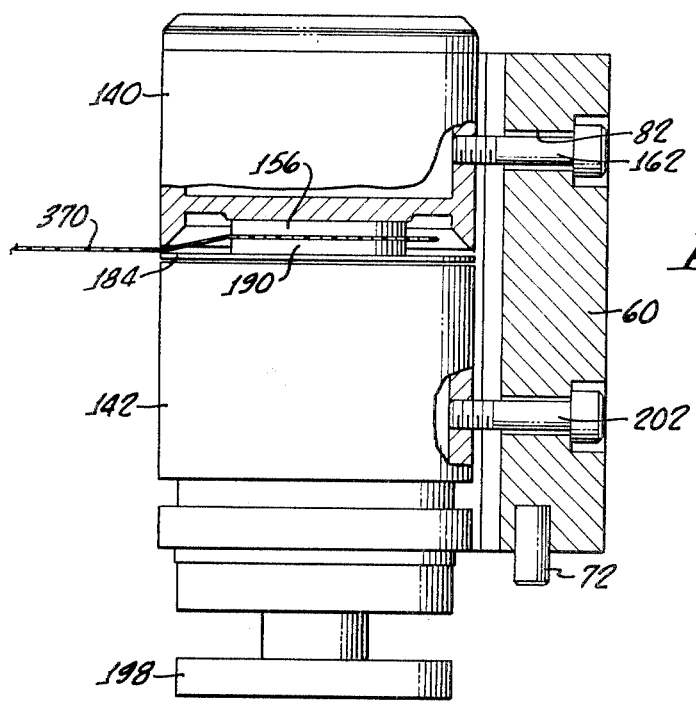
FIG. 20 is an elevation view partially in section showing the step of placing the upper male guide on the bracket using a tape to set the gap between the transformer winding of the uppermale guide and the transformer winding of the scanner.

Referring to FIG. 19, the biscuit is a cylindrical member having a flat upper surface 362, a cylindrical exterior surface 364 of the same radius r as the upper male guide, a recessed bottom surface 366, and a reference dowel 368 extending downward from the biscuit. The biscuit is positioned onto the bracket 60 with the exterior cylindrical surface of the biscuit butting against the vertical drum assembly reference surfaces 70a and 70b of the bracket and the top of the biscuit 362 butting against the underside of the reference tab 350b. The bolt 162 is extended through the upper oversized bore 82 in the bracket to fix the biscuit to the bracket in that position. The lower sub-assembly is then butted against the vertical drum assembly reference surfaces of the bracket to properly orient and locate the drum axis 76, and then is moved upward until the upper surface 185 of the drum plate 184 contacts the bottom surface of the reference dowel 368. The lower sub-assembly is then fixed to the bracket in that position by inserting and tightening the bolt 202. As the bolt 202 is smaller in diameter than the bore 84, the center of the bores 84 and 166 need not be precisely aligned.

Because the lower male guide 142 is of the same radius r as the fixture body, and is now butted against the flat V-shaped reference surfaces of the bracket in the same manner as was the fixture body previously, the axis 76 of the lower male guide 142 and of the scanning plate 184 is now in precisely the same position relative to the entry and exit guides as was the axis 268 of the fixture when the entry and exit guides were mounted. The vertical dimension v from the top of the biscuit to the bottom of the dowel 368 is fixed so as to precisely the desired dimension between the top 187 of the scanning plate 184 and the top 272 of the fixture, now represented by the underside of the reference tab 350b, in order to position the scanning level of the heads at the proper height relative to the entry and exit guides; the relationship between those guides and the reference tab 350b having previously been set by the guide mounting fixture. In other words, the guides 38 and 42 initially were fixed on the bracket in the proper position relative to the fixture axis 268 and the fixture top surface 272. The V-shaped way assures that the drum axis 76 in the same position as previously occupied by the fixture axis, and the reference tab and biscuit serve as temporary references for setting the height of the scan line 185.

The biscuit and reference plate are then removed and the upper male guide 140 is butted against the vertical reference surfaces of the bracket. In order to maintain the desired clearance between the rotary transformer winding 156 on the upper male guide and the rotary transformer winding 190 on the upper side of the drum plate, a thin film 370 of the desired thickness, for example, a one mil recording tape, is placed between the upper winding on the drum plate and the winding on the upper male guide. With the upper male guide in that position, the upper male bolt 162 is inserted and tightened to fix the upper male guide to the bracket. Again, the centers of the bores 82 and 152 need not be precisely aligned as the one bore 82 is oversize. The film is then removed.

(g) Mounting straightening posts and scanning assembly

It is important that the tape turn through the same horizontal angle θ in going around the exit guide 42 as in going around the entry guide 38 in order that the path of the tape centerline 15a between the first straightening post 23 and the entry guide, and between the exit guide and the second straightening post 25 be parallel to the top 6 of the case, i.e. horizontal in the exemplary embodiment. In a preferred embodiment θ is equal to 90°. A post mounting jig 372 is used in the preferred embodiment to assist in placing the straightening posts 23 and 25 on the chassis plate 220 in the proper place.

Figure 21:
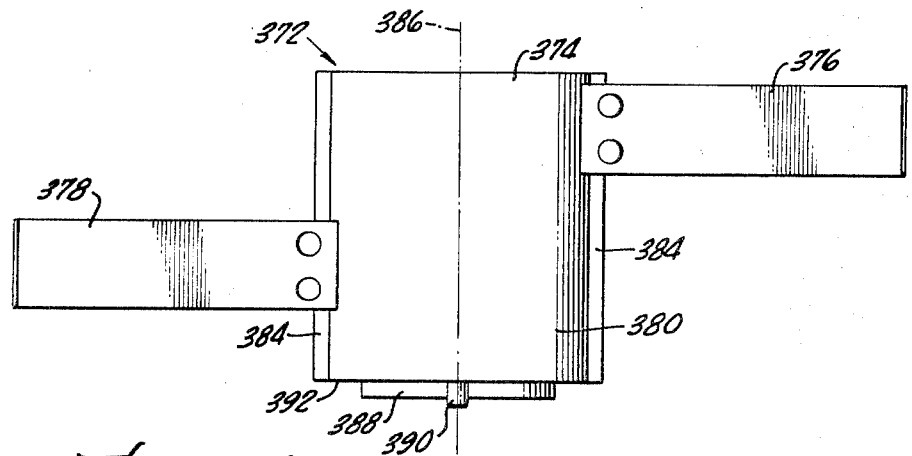
FIG. 21 is a front elevation view of a post positioning jig used in the method of this invention.
Figure 22:
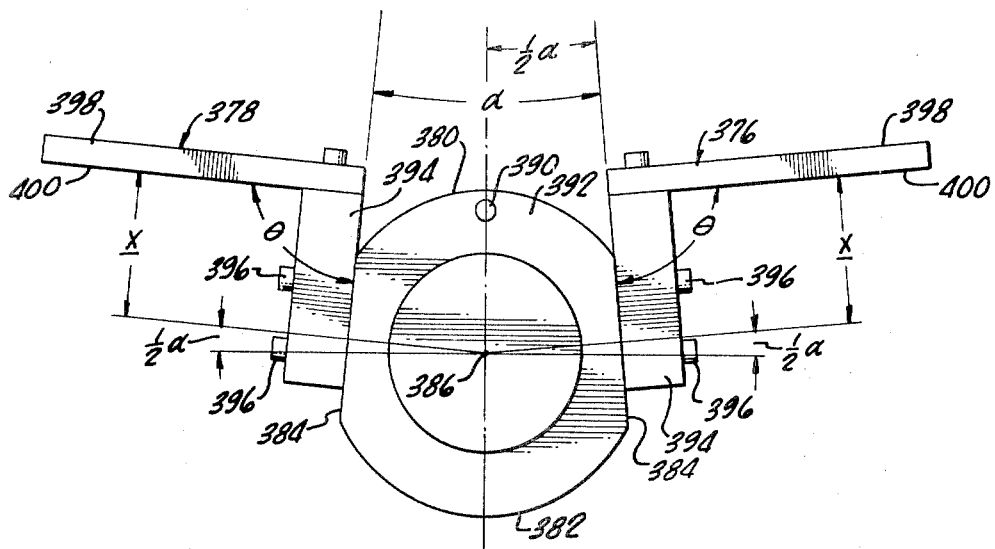
FIG. 22 is a bottom plan view of the post positioning jig.

As is shown in FIGS. 21 and 22, the post mounting jig includes a body 374 and a pair of arms 376 and 378. The body has a front wall 380, a rear wall 382, and two side walls 384. The front and rear wall form segments of an upright cylinder having a vertical axis 386. The side walls are flat and vertical. They converge forwardly at a horizontal angle α, the same as the angle α of convergence of the reference surfaces 296b of the guide mounting fixture. A reduced diameter cylindrical flange 388 depends from the body and is of the same diameter as the aperture 222 in the chassis plate. An aligning pin 390 of the same diameter as the aligning pin 72 of the bracket depends downwardly from the annular shoulder 392 formed on the bottom of the body at the change in body diameter.

Each of the arms includes an elongate support member 394 of rectangular cross-sectional configuration which is fastened onto one of the flat sides 384 of the body by a pair of bolts 396 and extends forward from the body. One of the arms 376 is mounted near the upper end of the body and the other arm 378 is mounted lower on the body, both arms being generally horizontal in their extent. A cantilevered extension 398 is bolted onto the forward end of each support member and extends outwardly therefrom. Each extension is of generally rectangular cross-sectional configuration, having a flat, positioning side surface 400. The horizontal angle θ between the arm positioning surface 400 and the associated flat side surface 384 of the body is equal to the angle θ through which the tape is to be turned around the guides 38 and 42. The arm positioning surfaces are each spaced from the axis 386 by a horizontal dimension x.

Figure 24:
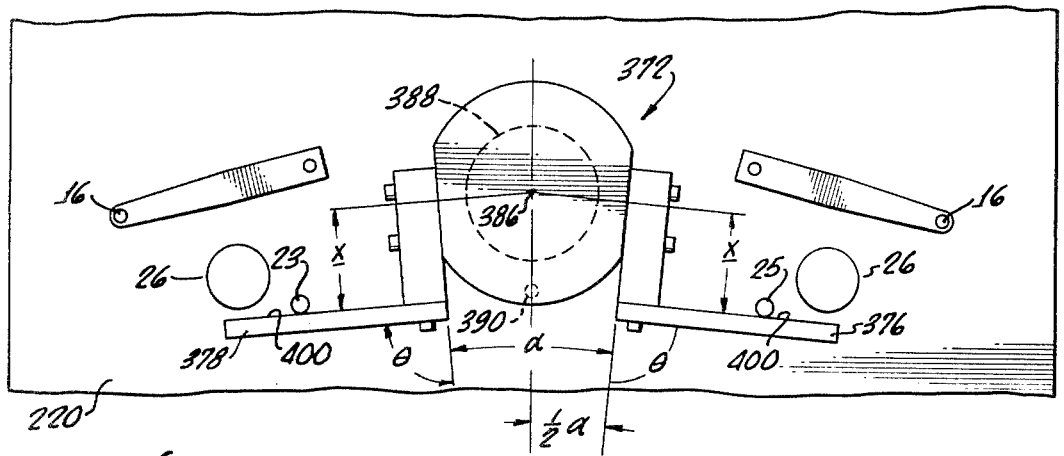
FIG. 24 is a view similar to that of FIG. 23 showing the post positioning jig in place on the chassis.

Referring to FIGS. 23 and 24, with the case top 6, the platform 8, and the three disk clamps 226 all removed, the post mounting jig 376 is placed on the upper side of the chassis plate 220 with the cylindrical flange 388 of the body fitted into the aperture 222 and the aligning pin 390 of the jig fitted into the oblong slot 224 in the chassis plate. The lower arm 378 will extend just above the level of the case top and the upper arm 376 will extend just above the level of the platform. The axis 386 of the post jig then is in the same position as will be the axis 76 of the drum assembly, and the positioning surface 400 of each arm located relative to the axis 386 such that the positioning surface 400 traces the desired path of the tape centerline 15a between the straightening post 23 or 25 and the entry or exit guide.

The straightening posts are positioned on the chassis plate at the proper height and with their vertical surface abutting the positioning surface 400 of a respective extension 376 or 378 and are fixed to the chassis 220. The precise location of the post 23 or 25 along the positioning surface is not critical inasmuch as the purpose of this placement is to control the direction which the tape travels coming from the first straightening post to the entry guide and from the exit guide to the second straightening post so that the tape turns through the horizontal angle θ at each guide.

With the straightening posts mounted on the chassis in the proper position, the jig 372 is removed and the scanning assembly is installed. Referring to FIG. 25, this is done by inserting the flywheel 198 and the lip 178 of the lower male guide down through the aperture 222 with the disk clamps 226 turned so their flat sides 228a face the aperture, thereby allowing the flange 182 to pass the clamps. With the aligning pin 72 positioned in the slot 224 and the flange 182 resting on the chassis plate, the disk clamps 226 are turned so the round side of each overlays the flange, and the clamp bolts 230 are tightened to fasten the assembly down. The aligning pin 72 assures that the assembly is properly oriented about its vertical axis 76.

What is claimed is:

1. In a method of assembling a scanning assembly for a tape transport, the method of mounting a helical-wrap drum assembly, and entry and exit tape guides, on a bracket having reference means thereon, using a fixture having first and second reference means in fixed position relative to each other, comprising the steps of:
    connecting the bracket to the fixture with the reference means of the bracket and the first reference means of the fixture cooperating to fix the bracket reference means in a known pre-selected position relative to the second reference means of the fixture;
    using the second reference means of the fixture to mount the entry and exit tape guides on the bracket at the desired location and orientation relative to the bracket reference means;
    removing the bracket from the fixture with the tape guides fixed on the bracket; and
    using the bracket reference means to mount the drum assembly on the bracket at the proper location and orientation relative to the tape guides.

2. A method in accordance with claim 1 wherein the second reference means of the fixture includes at least three mutually transverse reference surfaces for each guide, and the step of mounting the tape guides relative to the tape guide reference means comprises:
    butting each of the tape guides against said mutually transverse surfaces to establish the desired orientation and location of the tape guide relative to the bracket reference means.

3. A method in accordance with claim 2 wherein the transverse surfaces of the second reference means are mutually perpendicular, each tape guide has a flange at an edge of its tape guide surface and the step of positioning the tape guide further comprises:
    butting the tape guide surface of each tape guide against two of said mutually perpendicular surfaces and butting said flange against a third mutually perpendicular surface.

4. A method in accordance with claim 3 wherein the flange used to position each tape guide is at the edge of the tape guide surface disposed most nearly to the scanner of the drum.

5. A method in accordance with claim 2 wherein the fixture has means thereon for releasably locking the tape guides against said reference surfaces and the method of mounting the tape guides further comprises the steps of:
    clamping the tape guides against said reference surfaces; and
    adhering the clamped tape guides to the bracket to fix them in the desired position.

6. A method in accordance with claim 1 wherein the reference means on the bracket includes a pair of flat transverse surfaces parallel to the axis of the drum assembly and a third flat surface perpendicular to said axis, and the step of positioning the drum assembly on the bracket further comprises:
    butting the drum assembly against said pair of flat surfaces to fix the orientation and location of the drum assembly axis; and
    adjusting the drum assembly relative to said third flat surface to establish the position of the drum assembly along its axis.

7. A method in accordance with claim 6 wherein the drum assembly includes upper and lower male guides having generally cylindrical exterior surfaces, and the step of positioning the drum assembly on the bracket further comprises:
    butting the cylindrical exterior surface of the drum assembly upper and lower male guides against said pair of flat transverse surfaces.

8. A method in accordance with claim 7 wherein the first reference means on the fixture includes a cylindrical surface portion conforming in shape to a cylindrical surface portion of the drum assembly and the steps of connecting the bracket to the fixture and positioning the drum assembly on the bracket further comprise:
    butting said cylindrical reference surface of the fixture against the pair of transverse reference surfaces on the bracket prior to adjusting the position of the tape guides; and
    butting said conforming cylindrical surface of the drum assembly against said pair of surfaces on the bracket in mounting the drum assembly on the bracket.

9. A method in accordance with claim 8 wherein the first reference means of the fixture further includes a flat reference surface perpendicular to the cylindrical reference surface and the steps of positioning the bracket on the fixture and positioning the drum assembly on the bracket further comprise:
    adjusting the height of the bracket relative to the flat reference surface of the fixture;
    connecting a bolt through an oversize bore in the bracket into the cylindrical surface to the fixture to fix the bracket to the fixture;
    removing the bolt from the fixture after the tape guides have been fixed on the bracket in the desired position;
    connecting the bolt through the oversize bore in the bracket into the drum assembly to fix the drum assembly on the bracket after the drum assembly has been adjusted relative to the third surface.

10. A method in accordance with claim 9 wherein the step of adjusting the height of the bracket relative to the fixture further comprise:
    connecting a reference plate on the upper surface of the bracket prior to mounting the bracket on the fixture; and butting said reference plate against the flat reference surface on the fixture to position the bracket relative to the fixture.

11. A method in accordance with claim 10 wherein the drum includes an upper sub-assembly and a lower sub-assembly including the scanning head, and the step of mounting the drum on the bracket further comprises:

butting a first surface of a reference member against the reference plate;

butting the lower sub-assembly against said pair of reference surfaces on the bracket and against a second reference surface on the reference member and fixing the lower sub-assembly to the bracket in that position;

removing the reference member and the reference plate; and connecting the upper male guide to the bracket.

12. A method in accordance with claim 11 wherein the step of connecting the upper male guide to the bracket further comprises:

butting the upper male guide against said pair of bracket reference surfaces;

placing a thin spacer between the upper male guide and the lower sub-assembly to set the gap therebetween;

fixing the upper male guide to the bracket in that position; and removing the spacer.

13. A method in accordance with claim 6 wherein the drum assembly includes a lower male guide having the scanning head mounted thereon, and an upper male guide, and the step of positioning the drum on the bracket further comprises:

butting the exterior surface of the lower male guide against said pair of flat transverse reference surfaces on the bracket;

adjusting the lower male guide vertically to adjust the height of the scanning head relative to the third reference surface of the bracket;

fixing the lower male guide to the bracket in the adjusted position;

butting the upper male guide against said pair of flat transverse reference surfaces on the bracket;

adjusting the height of the upper male guide relative to the lower male guide; and fixing the upper male guide to the bracket in the adjusted position.

14. A method in accordance with claim 13 wherein the step of adjusting the height of the upper male guide further comprises:

placing a thin sheet spacer on a rotary transformer winding mounted on the scanner and extending the sheet beyond the drum assembly;

moving the upper male guide until a rotary transformer winding thereon is against the thin sheet to set the spacing between the transformer windings; and removing the thin sheet after the upper male guide has been fixed to the bracket.

15. A method in accordance with claim 13 wherein the steps of fixing the upper and lower male guide to the bracket each further comprise connecting a bolt through an oversize bore in the bracket into the guide.

16. A method in accordance with claim 1 wherein each tape guide has a pin depending therefrom, the bracket includes oversize bores for receiving the pins while permitting limited universal adjustment of the guide relative to the bracket, and the steps of mounting the tape guides further comprises the steps of:

inserting each of the pins loosely in a respective bore; and filling the space between the pin and the bore wall with adhesive after the guide has been adjusted to the desired position.

17. In a method of assembling a scanning assembly in accordance with claim 1 wherein the drum assembly has a lip at its lower end, the bracket has an aligning pin depending therefrom, and the fixture base has a slot therein at a known horizontal angle relative to the fixture reference means, the method of orienting the scanning assembly on a chassis having an aperture of about the same size as the lip, and a slot of about the same width as the pin, comprising the steps of:

inserting the pin in the fixture slot when connecting the bracket to the fixture;

after the drum assembly has been mounted on the bracket, mounting the scanning assembly on the chassis by inserting the lip in the chassis aperture and the pin in the chassis slot.

18. A method in accordance with claim 17 wherein a jig is used to orient the scanning assembly relative to first and second straightening posts which direct the tape to the entry guide and from the exit guide respectively, the jig having a lip corresponding in size to the lip of the drum assembly, an aligning pin the same size as the bracket aligning pin, and a pair of arms extending outwardly, further comprising the steps of:

inserting the jig lip and pin into the chassis aperture and slot before placing the scanning assembly on the chassis, the jig arms being arranged relative to the lip and pin in conformance to the arrangement on the bracket of the drum assembly lip and aligning pin relative to the entry and exit guides so that a surface on each arm traces a portion of the desired paths of the tape between the straightening posts and the scanning assembly when the jig is so positioned;

positioning the straightening posts against said arm surfaces and mounting the posts on the chassis in that position; and removing the jig from the chassis and mounting the scanning assembly on the chassis.

19. A method in accordance with claim 1 wherein the second reference means of the fixture are an entry guide positioning jig and an exit guide positioning jig each including a leg extending forwardly past the first reference means and having a guide reference surface thereon, a foot at the forward end of the leg having a guide reference surface transverse to the leg reference surface, and a third reference surface adjacent the leg and foot reference surfaces and transverse thereto, and the steps of mounting the entry and exit tape guides and removing the bracket from the fixture further comprise:

clamping the entry and exit guides each against the three reference surfaces of its associated jig;

adhering the entry and exit guides to the bracket;

unclamping the entry and exit guides after the adhesive has set; and removing the feet from the jig legs prior to removing the bracket from the fixture.

20. In the method of assembling a tape transport the method of mounting entry and exit tape guides and a helical-wrap drum assembly on a bracket using a fixture having reference means thereon, comprising:

mounting the bracket on the fixture;

adjusting the position of the entry and exit guides on the bracket to a pre-selected position relative to the fixture reference means;

fixing the entry and exit guides to the bracket in the adjusted position;

adjusting the position of the drum assembly on the bracket to a pre-selected position relative to the fixture reference means; and fixing the drum assembly to the bracket in the adjusted position.

21. A method in accordance with claim 20 wherein the step of adjusting the position of the drum assembly relative to the fixture reference means further comprises the steps of:

establishing reference means on the bracket from the fixture reference means;

removing the bracket from the fixture; and adjusting the position of the drum assembly on the bracket relative to the bracket reference means.

References Cited

UNITED STATES PATENTS

| | | | |
|---|---|---|---|
| 3,062,922 | 11/1962 | Beckner et al. | 179—100.2 |
| 3,227,815 | 1/1966 | Prochnow | 178—6.6 X |
| 3,319,014 | 5/1967 | Sugawa | 179—100.2 |
| 3,391,248 | 7/1968 | Hirota | 179—100.2 X |
| 3,418,424 | 12/1968 | Takayangi et al. | 179—100.2 X |
| 3,428,760 | 2/1969 | Hayashi et al. | 178—6.6 X |

FOREIGN PATENTS 913,326  12/1962  Great Britain.

JOHN F. CAMPBELL, Primary Examiner

V. A. DI PALMA, Assistant Examiner

U.S. Cl. X.R.

29—169.5, 468; 178—6.6; 179—100.2

PO-1050
(5/69)

UNITED STATES PATENT OFFICE
CERTIFICATE OF CORRECTION

Patent No. 3,516,146　　　　Dated June 23, 1970

Inventor(s) Alexander R. Maxey

It is certified that error appears in the above-identified patent and that said Letters Patent are hereby corrected as shown below:

Column 1, line 46 "o fthe" should be --of the--. Column 2, lines 49 and 50 insert before "drum" --bracket way, the mounting means permitting adjustment of the--. Column 5, line 57 "bodes" should be --bores--. Column 8, line 32 "clamp" should be --clamping--; line 49 "tap" should be --tape--. Column 9, line 12 "suport" should be --support--; line 35 "232" should be --132--; line 47 "sadde" should be --saddle--. Column 11, line 45 "hte" should be --the--. Column 13, line 7 insert --jig-- before "body".

Signed and sealed this 13th day of April 1971.

(SEAL)
Attest:

EDWARD M. FLETCHER, JR.　　　　WILLIAM E. SCHUYLER, JR.
Attesting Officer　　　　　　　　Commissioner of Patents